(12) United States Patent
Wu

(10) Patent No.: US 9,074,659 B2
(45) Date of Patent: Jul. 7, 2015

(54) ACTUATOR WITH POSITION DETECTING MECHANISM

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 156 days.

(21) Appl. No.: 13/926,279

(22) Filed: Jun. 25, 2013

(65) Prior Publication Data

US 2014/0345404 A1    Nov. 27, 2014

(30) Foreign Application Priority Data

May 23, 2013   (TW) .............................. 102118164 A

(51) Int. Cl.
*F16D 11/10*        (2006.01)
*F16H 1/12*         (2006.01)
(Continued)

(52) U.S. Cl.
CPC ........... *F16H 1/125* (2013.01); *Y10T 74/19614* (2015.01); *F16D 2300/18* (2013.01);
(Continued)

(58) Field of Classification Search
CPC ............. F16H 1/25; F16H 1/16; F16H 25/20; F16H 25/2015; F16H 25/24; F16H 1/125; F16D 11/10; F16D 2011/002; F16D 2300/18
USPC ............ 74/89.23, 89.34, 89.37, 89.38, 89.39, 74/405, 606 R, 424.78
See application file for complete search history.

(56) References Cited

U.S. PATENT DOCUMENTS

| 4,920,816 A | * | 5/1990 | Inabe et al. | ................... 74/89.38 |
| 5,673,593 A | * | 10/1997 | Lafferty | ........................ 74/89.38 |

(Continued)

FOREIGN PATENT DOCUMENTS

| CN | 100552263 C | 10/2009 |
| DE | 202007001797 U1 | 4/2007 |

(Continued)

OTHER PUBLICATIONS

1st OA dated Sep. 2, 2014 of the corresponding DE patent application No. 102013108031.6.

(Continued)

*Primary Examiner* — William Kelleher
*Assistant Examiner* — Jude Agendia
(74) *Attorney, Agent, or Firm* — Chun-Ming Shih; HDLS IPR Services

(57) ABSTRACT

An actuator with a position detection mechanism includes a main body, a transmission mechanism, a quick-release mechanism and a position detection mechanism. The transmission mechanism includes a worm gear with protruding keys and a lead screw shaft. The quick-release mechanism is mounted onto the lead screw shaft and includes a clutch gear with key slots for disengaging or engaging with the protruding keys in order to move axially relative to the worm gear. The position detection mechanism includes a variable resistor, an actuating gear mounted on the lead screw shaft to rotate altogether therewith and a driving gear connected to the variable resistor and engaged with the actuating gear. When the worm gear disengages from the clutch gear, a particular resistor value is formed at the variable resistor; therefore, disengaged or engaged positions of the worm gear and the clutch gear can be precisely controlled.

6 Claims, 8 Drawing Sheets

(51) Int. Cl.
*F16H 25/20* (2006.01)
*F16D 11/00* (2006.01)

(52) U.S. Cl.
CPC .... *F16H25/2015* (2013.01); *F16H 2025/2084* (2013.01); *F16H 2025/209* (2013.01); *F16H 2025/2071* (2013.01); *F16D 11/10* (2013.01); *F16D 2011/002* (2013.01)

(56) References Cited

U.S. PATENT DOCUMENTS

| | | | |
|---|---|---|---|
| 5,809,833 A * | 9/1998 | Newport et al. | 74/89.37 |
| 6,513,398 B1 * | 2/2003 | Finkemeyer | 74/89.28 |
| 6,781,265 B2 * | 8/2004 | Hayashida et al. | 310/80 |
| 7,533,591 B2 * | 5/2009 | Wang | 74/89.39 |
| 8,091,444 B2 * | 1/2012 | Tseng | 74/89.39 |
| 8,646,348 B2 * | 2/2014 | Hung | 74/89.38 |
| 8,733,192 B2 * | 5/2014 | Wu | 74/89.39 |
| 2004/0093969 A1 * | 5/2004 | Nielsen | 74/89.23 |
| 2010/0282008 A1 * | 11/2010 | Knudsen et al. | 74/89.23 |

FOREIGN PATENT DOCUMENTS

| | | |
|---|---|---|
| EP | 2232100 B1 | 9/2010 |
| TW | M296325 U | 8/2006 |
| TW | M314280 U | 6/2007 |
| TW | M319581 U | 9/2007 |
| TW | M452540 U | 5/2013 |
| TW | M462313 U | 9/2013 |
| WO | 2007006313 A1 | 1/2007 |

OTHER PUBLICATIONS

1st OA dated Jan. 28, 2015 of the corresponding TW patent application No. 102118164.

* cited by examiner

ACTUATOR WITH POSITION DETECTING MECHANISM

BACKGROUND OF THE INVENTION

1. Field of the Invention

The present invention is related to an actuator, in particular, to an actuator with a position detecting mechanism.

2. Description of Related Art

It is known and common to use actuators on equipment such as electric medical beds, treadmills and wheelchairs for adjusting the elevations and tilting angles thereof. For medical emergencies and patient treatments, actuators with a quick-release mechanism allow quick adjustments on the medical beds such that the precious time for medical treatments can be significantly saved. The research of the present invention is based on such needs and actuators to provide further improvements thereto.

A conventional actuator typically comprises a main body, a transmission mechanism and a quick-release mechanism. The main body comprises an electric motor and a worm shaft extended outward from a center of the electric motor. The transmission mechanism comprises a lead screw shaft and a worm gear mounted on one end of the lead screw shaft and engaged in motion with the worm shaft. The quick-release mechanism comprises two cylindrical connecting members, in which one cylindrical connecting member is secured onto the lead screw shaft to rotate altogether therewith and another cylindrical connecting member is secured onto the worm gear to rotate altogether therewith. By using the engagement and disengagement between the cylindrical connecting members, the lead screw shaft and worm gear can be either brought to rotate altogether or disengaged from each other.

However, such conventional actuator is found to have the following drawbacks during its practical uses. As it is often of a complicated structure with various components, it can be difficult for assembly and installation. In addition, the material and manufacturing costs of the components are high, which significantly lowers its useful applications. Furthermore, since there is no corresponding detection being performed on the location of each one of the torque transmission components during the engagement and disengagement of the cylindrical connecting members, inaccurate positioning of the torque transmission components often occurs, which causes the torque transmission to be unable to engage properly for rotations and creates significant problems and inconvenience to the practical uses and operations thereof.

SUMMARY OF THE INVENTION

An objective of the present invention is to provide an actuator with a position detection mechanism which is able to detect the configuration of the mechanism with positions in order to precisely control the positions of the connections of disengagement or engagement between the worm gear member and the clutch gear.

To achieve the aforementioned objective, the present invention provides an actuator with a position detection mechanism, comprising a main body, a transmission mechanism, a quick-release mechanism and a position detection mechanism. The transmission mechanism is installed on the main body and comprises a worm gear member and a lead screw shaft penetrating through the worm gear member; wherein the worm gear member comprises a plurality of protruding keys. The quick-release mechanism is mounted on the lead screw shaft and arranged on one side of the worm gear member and comprises an clutch gear; wherein the clutch gear is configured to move axially relative to the worm gear member and comprises a plurality of key slots to engage in transmission or disengage from transmission with the plurality of protruding keys. The position detection mechanism comprises a variable resistor, an actuating gear and a driving gear. The actuating gear is mounted on the lead screw shaft to rotate altogether therewith, and the driving gear is connected to the variable resistor and engaged with the actuating gear for transmission; wherein when the worm gear member is released from the clutch gear, a particular resistor value is formed at the variable resistor.

To achieve the aforementioned objective, the present invention further provides an actuator with a position detection mechanism, comprising a main body, a transmission mechanism, a quick-release mechanism and a position detection mechanism. The transmission mechanism is installed on the main body and comprises a worm gear member and a lead screw shaft penetrating through the worm gear member; wherein the worm gear member comprises a plurality of protruding keys. The quick-release mechanism is mounted on the lead screw shaft and arranged on one side of the worm gear member and comprises an clutch gear; wherein the clutch gear is configured to move axially relative to the worm gear member and comprising a plurality of key slots to engage in transmission or disengage from transmission with the plurality of protruding keys. The position detection mechanism comprises a variable resistor with a rotating axle driven by the lead screw shaft for rotations; wherein when the worm gear member is released from the clutch gear, a particular resistor value is formed at the variable resistor due to rotations of the rotating axle.

The present invention further includes the following merits. Since the amount of component used is less, the cost can be significantly reduced. By using the particular resistor value generated due to the rotations of the rotating axle of the variable resistor driven by the lead screw shaft, the plurality of protruding keys of the worm gear member can precisely engage into the plurality of key slots of the clutch gear without errors such that the drawbacks of having improper or imprecise engagements between the components of known arts can be overcome. With the configuration of the position detection mechanism, the operation of the actuator can be significantly improved for convenient uses thereof.

DETAILED DESCRIPTION OF THE INVENTION

Figure 1:
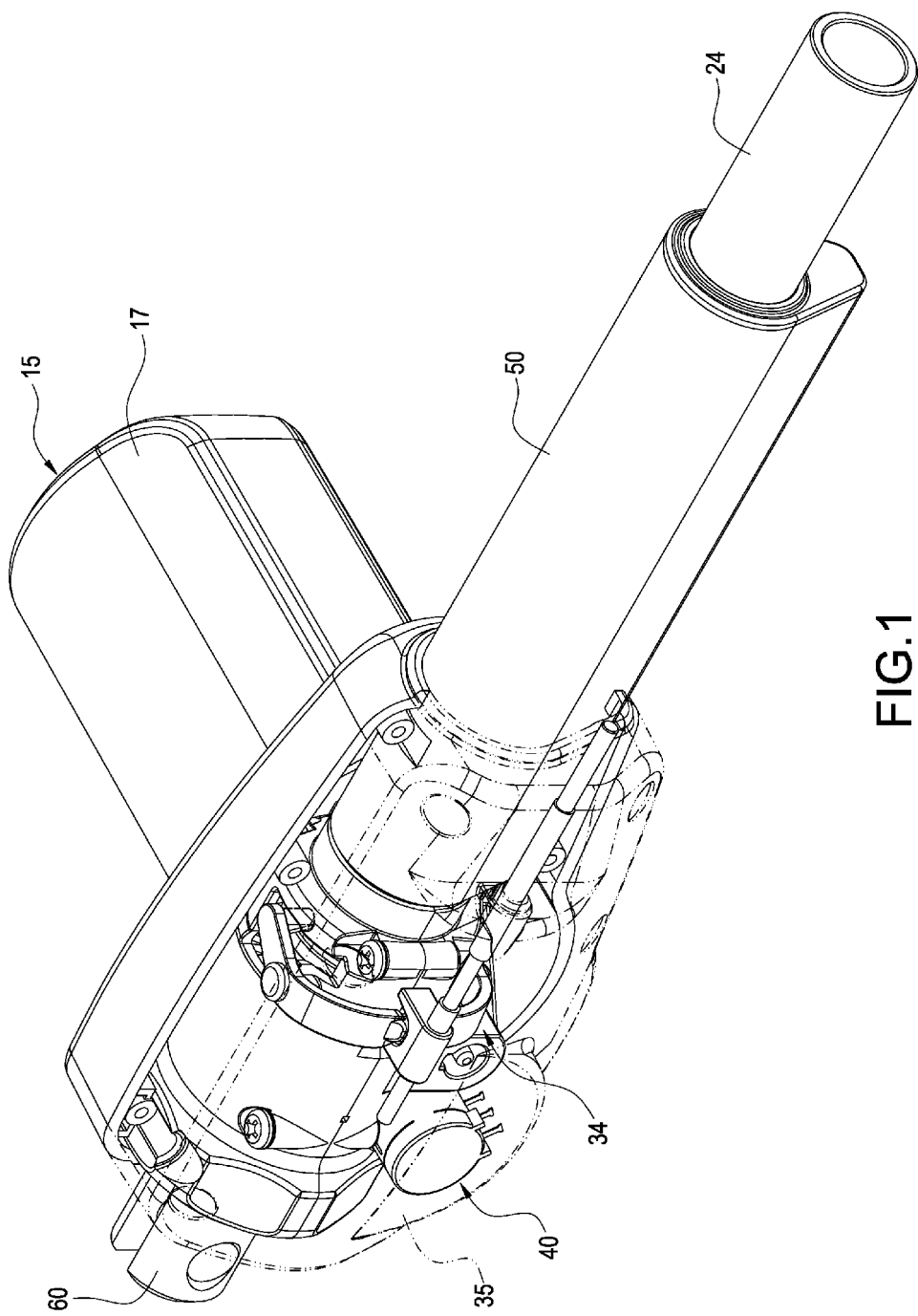
FIG. 1 is a perspective view showing an assembly of the actuator of the present invention.

The following provides detailed description of embodiments of the present invention along with the accompanied drawings. It can, however, be understood that the accompanied drawings are provided for illustrative purposes only and shall not be treated as limitations to the present invention.

As shown in FIG. 1 to FIG. 5, the present invention provides an actuator with a position detection mechanism, comprising a main body 10, a transmission mechanism 20, a quick-release mechanism 30 and a position detection mechanism 40.

The main body 10 comprises a base 11 and an electric motor 15. The base 11 comprises a lower housing base 12 and an upper housing base 13 attached onto the lower housing base correspondingly. Each one of the housing bases 12, 13 is generally of a semi-cylindrical shape. A central hollow chamber 14 is formed between the upper housing base 13 and the lower housing base 12, and the upper housing base 13 and the lower housing base 12 are secured with each other via fastening means such as screws. A pair of screw columns corresponding to each other is formed on an outer of the lower housing base 12 and the upper housing base 13.

Figure 4:
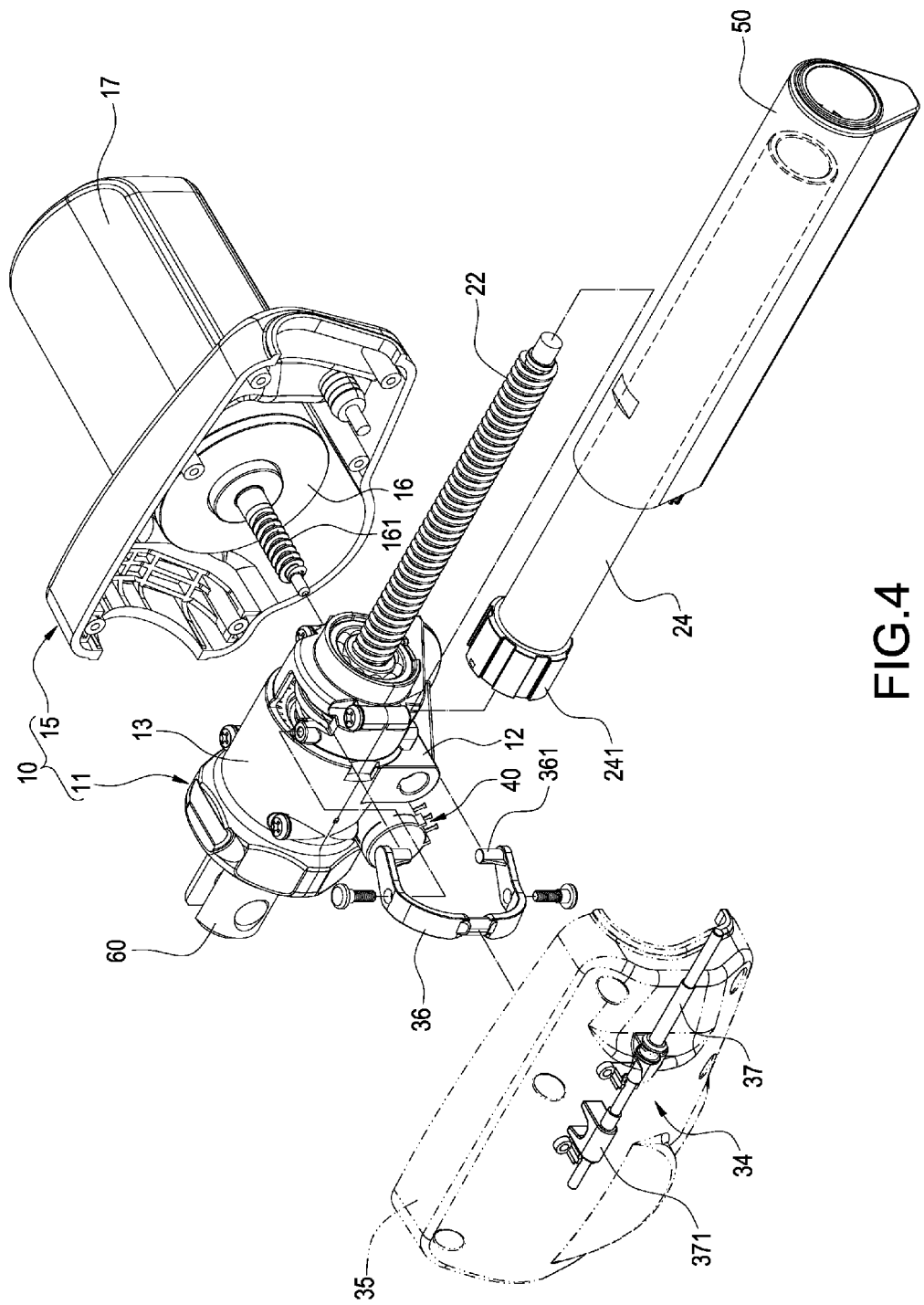
FIG. 4 is an exploded view showing the revolving assembly attached to the main body and the transmission mechanism of the present invention.
Figure 5:
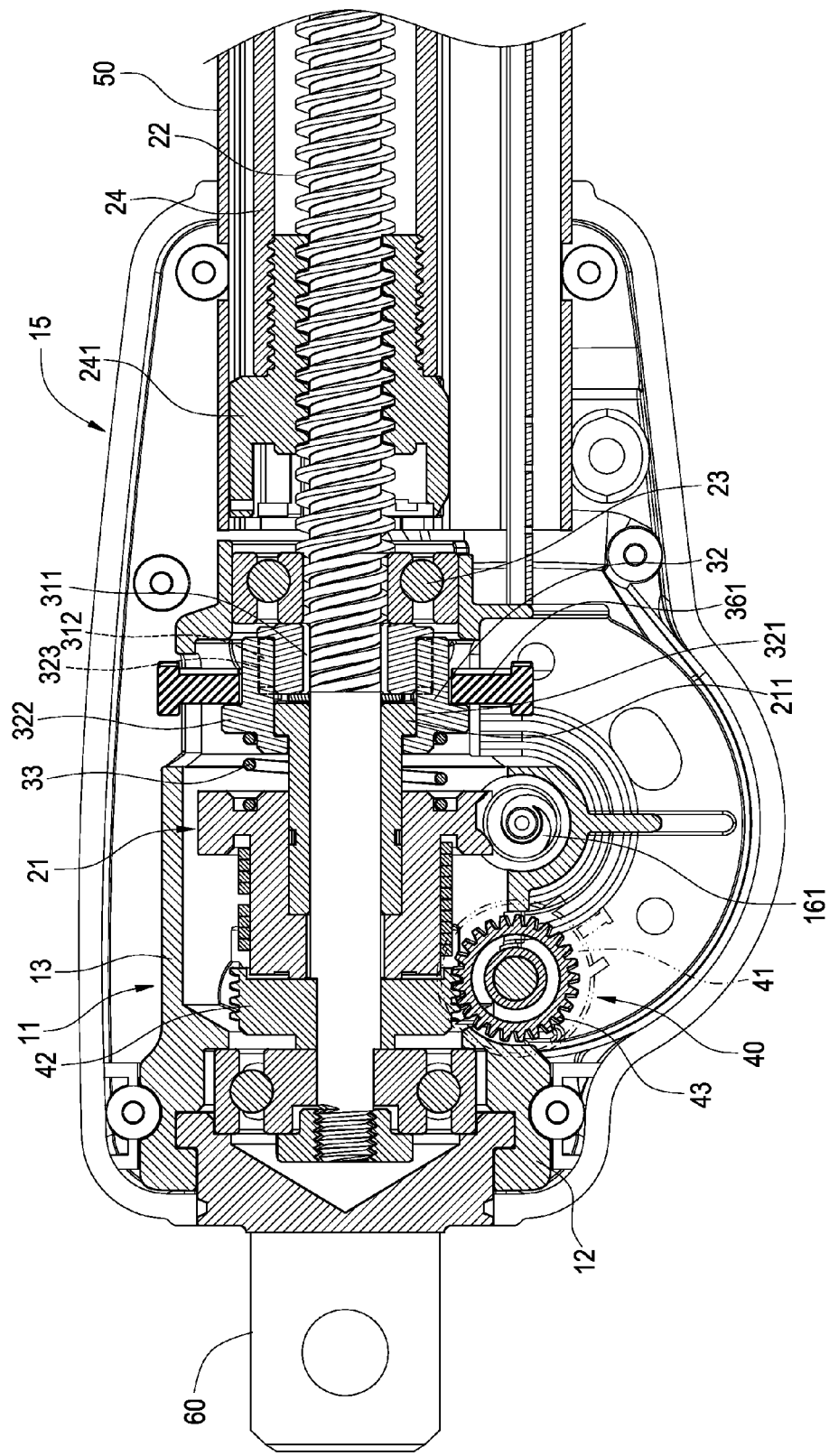
FIG. 5 is a cross sectional view of an assembly of the actuator of the present invention.

The electric motor 15 comprises an electromechanical member 16 and an outer housing 17 provided for receiving the electromechanical member 16 therein, as shown in FIG. 4. A worm shaft 161 extends outward from a center of the electromechanical member 16. The worm shaft 161 penetrates into the internal of the chamber 14 of the base 10 as the outer housing 17 is adjacent to the base 11.

Figure 2:
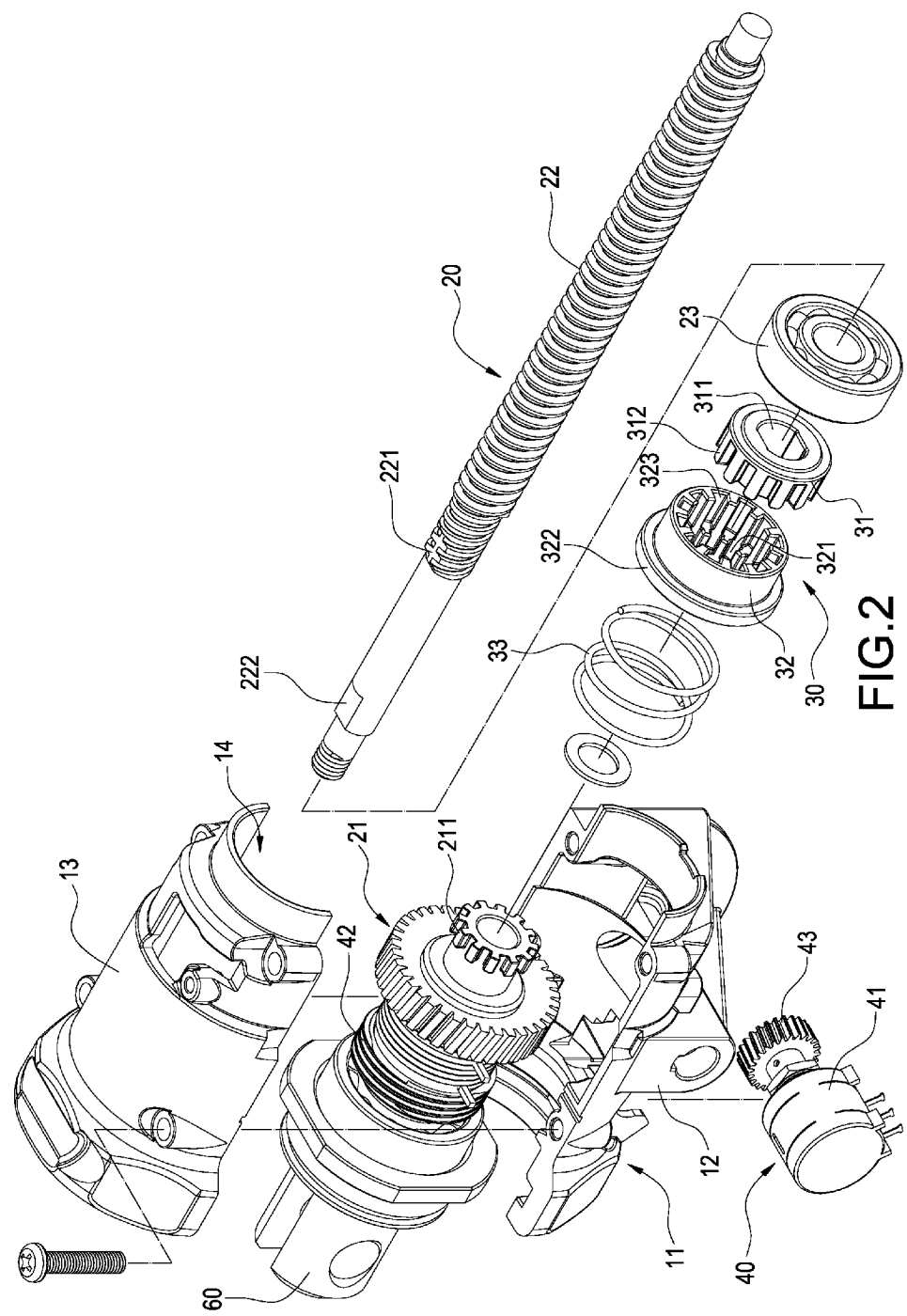
FIG. 2 is an exploded view showing the components of the present invention.

The transmission mechanism 20 comprises a worm gear member 21, a lead screw shaft 22 and a bearing 33, as shown in FIG. 2. The worm gear member 21 comprises a plurality of protruding keys 211 on one end facing toward the quick-release mechanism 30. The bearing 23 is received within and secured onto the internal of the chamber 14 of the base 11. One end of the lead screw shaft 22 penetrates through the worm gear member 21 and is supported on the base 11 by the bearing 23. The lead screw shaft 22 comprises a first securement section 221 and a second securement section 222.

The transmission mechanism 20 further comprises an extendable tube 24, as shown in FIG. 4. The extendable tube 24 comprises a screw nut 241 used for attaching to the lead screw shaft 22 to be screwed thereon for transmission. The lead screw shaft 22 is a non-self-locking lead screw shaft; in other words, when the screw nut 241 is subject to an axial push force or pressure, the lead screw shaft 22 is able to rotate freely under such force or pressure.

Figure 3:
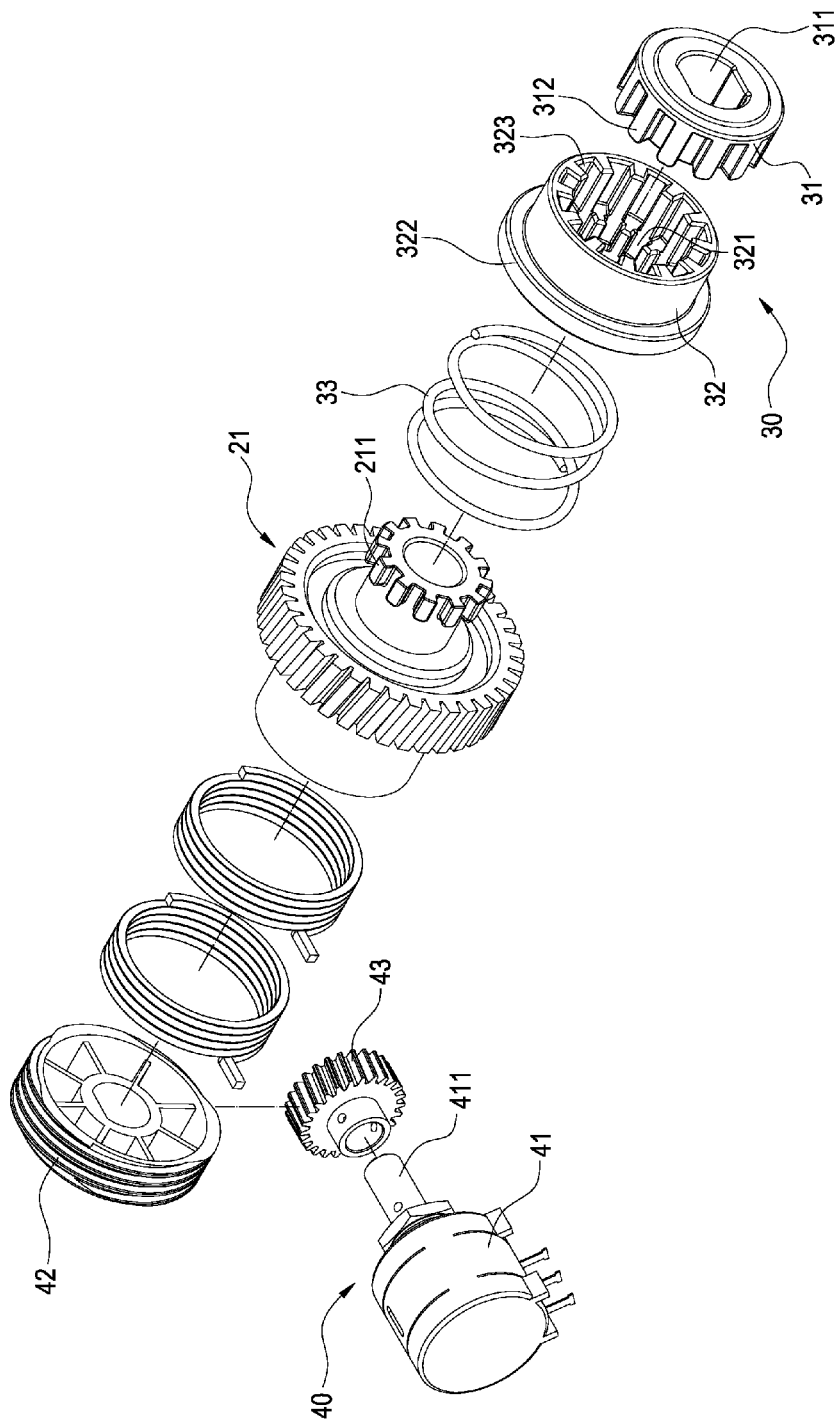
FIG. 3 is an exploded view showing the worm gear member, the quick-release mechanism and the position detection mechanism of the present invention.

The quick-release mechanism 30 is mounted onto the lead screw shaft 22 and is formed on one side of the worm gear member 21. The quick-release mechanism 30 comprises a securement gear 31 and a clutch gear 32 mounted onto the securement gear 31, as shown in FIG. 3. The securement gear 31 and the clutch gear 32 are generally of a cylinder shape. The securement gear 31 comprises a positioning hole 311, and the securement gear 31 is mounted onto the first positioning section 221 of the lead screw shaft 22 via the positioning hole 311 thereof in order to rotate altogether. The inner wall of the clutch gear 32 comprises a plurality of key slots 321 for selectively engaging with the aforementioned protruding keys 216. In addition, the outer circumference of the securement gear 31 comprises a plurality of rotation-stopping keys 312 surrounding thereon. The inner wall of the clutch gear 32 comprises a plurality of slots 323 for engaging with the rotation-stopping keys 312. The clutch gear 32 is able to axially move relative to the securement gear 31 and the worm gear member 21. A blocking ring 322 is formed on an end of the clutch gear 32 away from the securement gear 31. Furthermore, the design can also be altered to replace the clutch gear 32 with the securement gear 31, and when the worm gear member 21 is pushed to move along the lead screw shaft 22, the worm gear member 21 and the securement gear 31 would then be disengaged from each other (not shown in the figure).

The quick-release mechanism 30 further comprises an elastic member 33 and a revolving assembly 34. In this embodiment, the elastic member 33 is a spiral compression spring and is mounted on an outer circumference of the aforementioned lead screw shaft 22 and is clamped between the worm gear member 21 and the clutch gear 32. The revolving assembly 34 further comprises a shield cover 35, a rotating member 36 and a pulling rod 37, as shown in FIG. 4. The shield cover 35 correspondingly attaches to the aforementioned outer housing 17 and covers the base 11. The rotating member 36 is of a U shape and this rotating member 36 is pivotally attached to the screw columns of the aforementioned housing bases 12, 13 via fastening means such as screws. An opening end of the rotating member 36 comprises a pair of dialing arms 361 extended inward, and the pair of dialing arms 361 is arranged corresponding to the blocking ring 322 of the aforementioned clutch gear 32. The pulling rod 37 penetrates through the shield cover 35 and includes one portion in the internal of the shield cover 35 and another portion protruding outward to the external of the shield cover 35. In addition, the pulling rod 37 is able to axially move relative to the shield cover 35. One end of the pulling rod 37 comprises a hook 371, and the hook 371 is correspondingly connected to a closed end of the rotating member 36.

In this embodiment, the position detection mechanism 40 comprises a variable resistor (VR) 41, an actuating gear 42 and a driving gear 43. The variable resistor 41 is also known as a potentiometer (POT) and comprises a rotating axle 411. A resistor value change is in linear relationship with a rotational angle of the rotating axle 411; in other words, a resistor value corresponds to an angle rotated by the rotating axle 411. The actuating gear 42 is mounted onto the second positioning section 222 of the lead screw shaft 22, as shown in FIG. 2, in order to rotate altogether therewith. The driving gear 43 is connected to the rotating axle 411 of the variable resistor 41 in order to rotate synchronously. In addition, the driving gear 43 and the actuating gear 42 are engaged with each other for transmission. With the assembly of the aforementioned components, when the lead screw shaft 22 is actuated by the worm shaft 161 to cause the worm gear member 21, the clutch gear 32 and the securement gear 31 to rotate altogether, the actuating gear 42 is then also brought to rotate synchronously and the actuating gear 42 actuates the driving gear 43 to rotate; therefore, with such synchronous rotations of the driving gear 43 and the rotating axle 411, various different resistor values can be obtained from the variable resistor 41.

The actuator of the present invention further comprises an outer tube 50 and a rear supporting seat 60. The outer tube 50 is mounted on an outer circumference of the extendable tube 24 and comprises one end secured onto the end portion of the outer housing 17 and the shield cover 35; in addition, with the engagement between the guiding rail and the slot, the extendable tube 24 is allowed to move linearly relative to the outer tube 50. The rear supporting seat 60 penetrates through one end of the base 11 away from the outer tube 50 and secured thereon, which also comprises a portion protruding outward to another end of the outer housing 17 and the shield cover 35.

Figure 6:
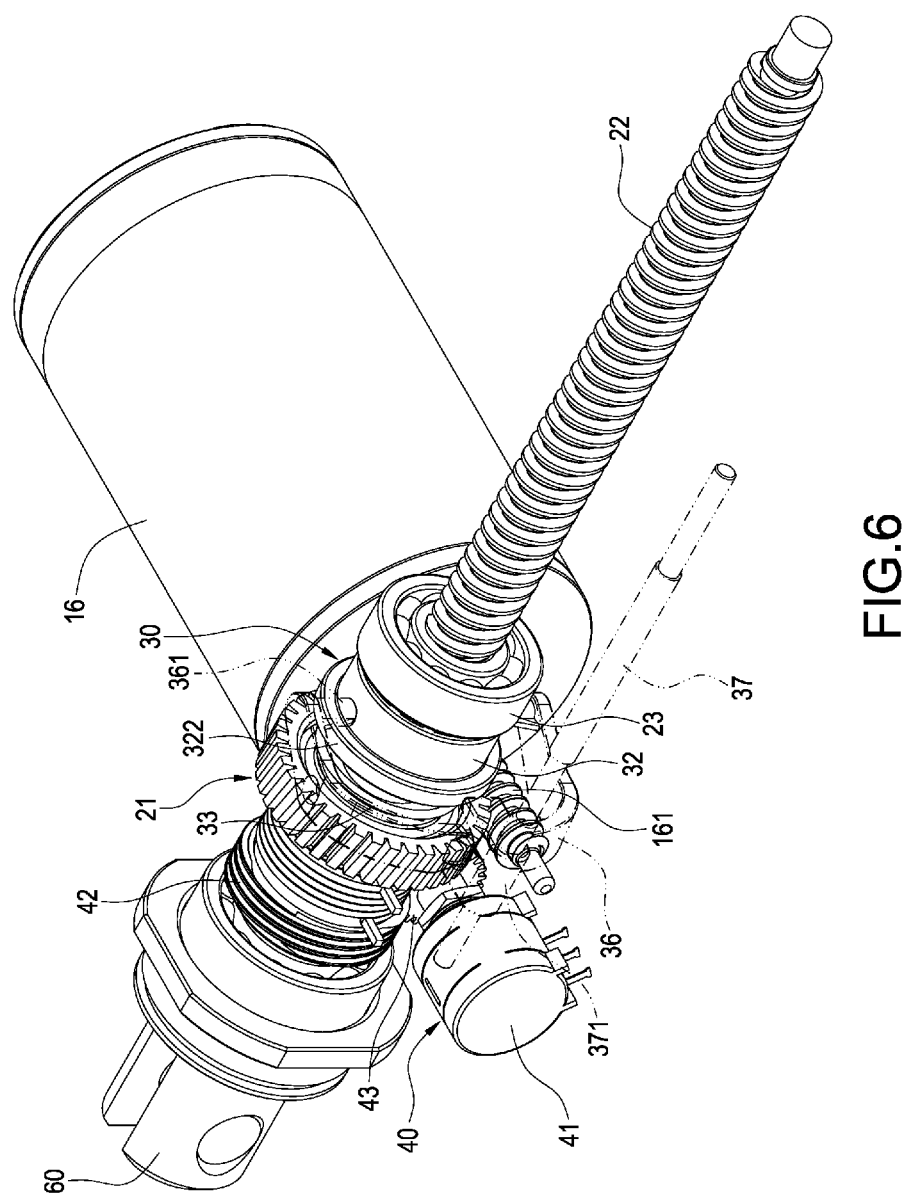
FIG. 6 is a perspective view of the present invention showing the revolving assembly prior to its actuation.
Figure 7:
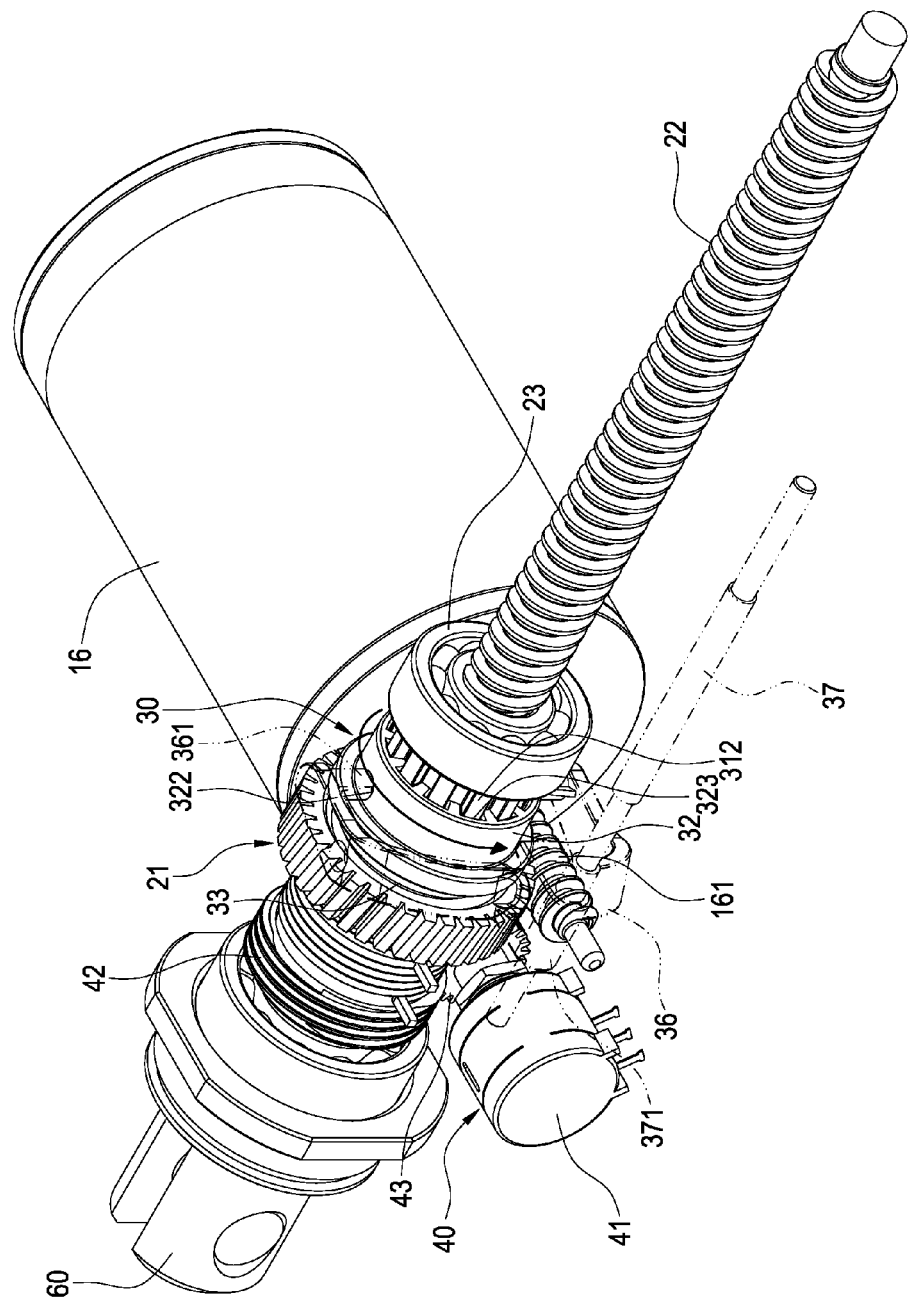
FIG. 7 is a perspective view of the present invention showing the revolving assembly after its actuation.
Figure 8:
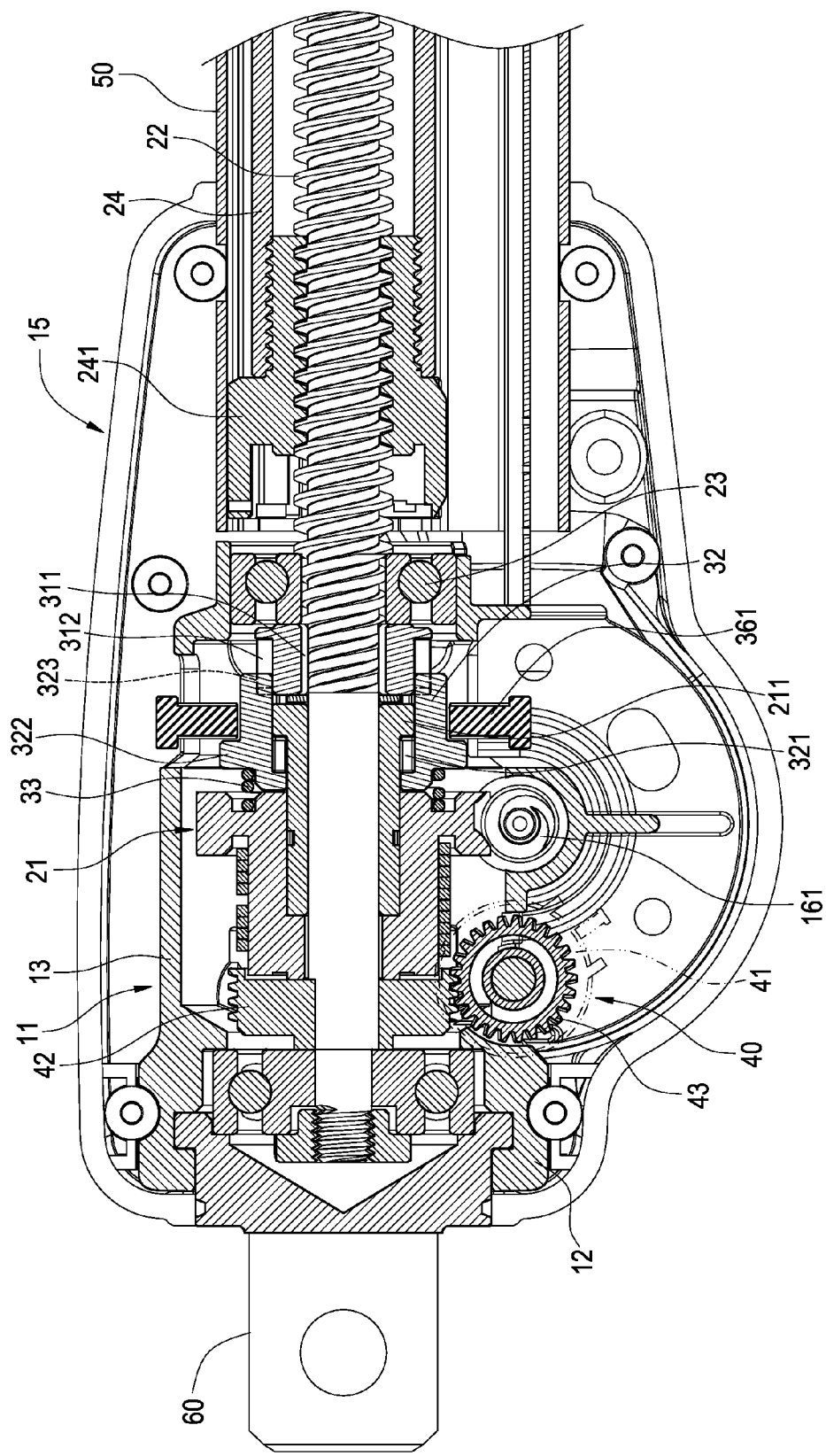
FIG. 8 is a cross sectional view of FIG. 7.

Referring to FIG. 6 to FIG. 8, FIG. 6 shows a perspective view of the pulling rod 37 prior to its actuation, and FIG. 7 shows a perspective view of the pulling rod 37 after its actuation. During operational uses, the pulling rod 37 moves away from the rear supporting seat 60, and the hook 371 of the pulling rod 37 actuates the rotating member 36 to generate rotation. The rotating member 36 uses the screw columns onto which it is pivotally attached to as rotational centers to allow the dialing arm 361 to push the blocking ring 322 of the clutch gear 32 such that the clutch gear 32 moves toward the worm gear member 21, during which, the protruding keys 211 of the worm gear member 21 disengage from the key slots 321 of the clutch gear 32 to release the torque transmission, as shown in FIG. 8, such that the worm shaft 161 and the lead screw shaft 22 are stopped for transmission thereof at this moment. At the time when the lead screw shaft 22 stops to rotate, the actuating gear 42 would not further actuate the driving gear 43 and the rotating axle 411 of the variable resistor 41 to rotate. By electrically connecting the variable resistor 41 to a control device (not shown in the figure) and when the control device allows the worm gear member 21 and the clutch gear 32 to disengage from each other, a particular resistor value corresponds to the rotational angle rotated by the rotating axle 411 can be loaded into the memory of the control device. With the use of such particular resistor value, the engagement position or disengagement position of the protruding keys 211 of the worm gear member 21 and the key slots 321 of the clutch gear 32 can be obtained in order to prevent any loss or errors to occur.

In view of the above, the actuator with a position detection mechanism of the present invention is able to achieve the objectives expected and to overcome the drawbacks of known arts, which is of novelty and inventive step to comply with the requirements of patentability and is applied legitimately for the grant of the patent right.

What is claimed is:

1. An actuator with a position detection mechanism, comprising:
   a main body (10);
   a transmission mechanism (20) installed on said main body (10) and comprising a worm gear member (21) and a lead screw shaft (22) penetrating through said worm gear member (21); said worm gear member (21) comprising a plurality of protruding keys (211);
   a quick-release mechanism (30) mounted on said lead screw shaft (22) and arranged on a front side of said worm gear member (21) and comprising a clutch gear (32); said clutch gear (32) configured to move axially relative to said worm gear member (21) and comprising a plurality of key slots (321) to engage in transmission or disengage from transmission with said plurality of protruding keys (211); and
   a position detection mechanism (40) comprising a variable resistor (41), an actuating gear (42) and a driving gear (43); said actuating gear (42) mounted on a back side of said worm gear member (21) on said lead screw shaft (22) to rotate altogether therewith; said driving gear (43) connected to said variable resistor (41) and engaged with said actuating gear (42) for transmission;
   wherein said worm gear member (21) is disposed on said lead screw shaft (22) and sandwiched between said actuating gear (42) and said quick-release mechanism (30), and
   wherein when said worm gear member (21) is released from said clutch gear (32), said worm gear member (21) remains stationary, said clutch gear (32) and said actuating gear (42) are driven by said lead screw shaft (22) to rotate, and said driving gear (43) is driven by said actuating gear (42) to form a particular resistor value at said variable resistor (41).

2. The actuator with a position detection mechanism according to claim 1, wherein said lead screw shaft (22) comprises a first positioning section (221); said quick-release mechanism (30) further comprises a securement gear (31) secured onto said first positioning section (221); said securement gear (31) penetrates through the clutch gear (32) to move axially relative to each other.

3. The actuator with a position detection mechanism according to claim 2, wherein said lead screw shaft (22) further comprises a second positioning section (222); said actuating gear (42) is mounted onto said second positioning section (222); said variable resistor (41) comprises a rotating axle (411); said driving gear (43) is connected to said rotating axle (411) and rotates synchronously therewith.

4. The actuator with a position detection mechanism according to claim 3, wherein a resistor value change of said variable resistor (41) is in a linear relationship with a rotational angle of said rotating axle (411).

5. The actuator with a position detection mechanism according to claim 1, wherein said quick-release mechanism (30) further comprises an elastic member (33) mounted onto an outer circumference of said lead screw shaft (22) and clamped between said worm gear member (21) and said clutch gear (32).

6. The actuator with a position detection mechanism according to claim 5, wherein said quick-release mechanism (30) further comprises a revolving assembly (34); said revolving assembly (34) comprises a shield cover (35), a rotating member (36) and a pulling rod (37); said shield cover (35) covers said main body (10); said rotating member (36) is of a U shape and is pivotally attached to said main body (10); said pulling rod (37) penetrates through said shield cover (35) and comprises a hook (371); said hook (371) is connected correspondingly to a closed end of said rotating member (36); an opening end of said rotating member (36) comprises a pair of dialing arms (361) extended inward; said pair of dialing arms (361) pushes and moves relative to said clutch gear (32).

* * * * *